US009926457B2

(12) United States Patent
Henderson

(10) Patent No.: US 9,926,457 B2
(45) Date of Patent: Mar. 27, 2018

(54) INHERENTLY PRINTABLE POLYMERIC MATERIAL AND RELATED METHODS

(71) Applicant: Avery Dennison Corporation, Glendale, CA (US)

(72) Inventor: Kevin O. Henderson, Willoughby Hills, OH (US)

(73) Assignee: Avery Dennison Corporation, Glendale, CA (US)

( * ) Notice: Subject to any disclaimer, the term of this patent is extended or adjusted under 35 U.S.C. 154(b) by 162 days.

(21) Appl. No.: 14/970,690

(22) Filed: Dec. 16, 2015

(65) Prior Publication Data

US 2016/0194514 A1 Jul. 7, 2016

Related U.S. Application Data

(60) Provisional application No. 62/099,744, filed on Jan. 5, 2015.

(51) Int. Cl.
| | | |
|---|---|---|
| B32B 3/10 | (2006.01) |
| C09D 129/02 | (2006.01) |
| C09D 145/00 | (2006.01) |
| C09D 123/08 | (2006.01) |
| C08L 23/08 | (2006.01) |

(52) U.S. Cl.
CPC ........ *C09D 129/02* (2013.01); *C08L 23/0815* (2013.01); *C08L 23/0861* (2013.01); *C09D 123/0861* (2013.01); *C09D 145/00* (2013.01); C08L 23/08 (2013.01); C08L 2203/16 (2013.01)

(58) Field of Classification Search
None
See application file for complete search history.

(56) References Cited

U.S. PATENT DOCUMENTS

| | | | |
|---|---|---|---|
| 3,264,272 A | 8/1966 | Rees | |
| 3,454,280 A | 7/1969 | Broughton et al. | |
| 5,298,571 A | 3/1994 | Statz et al. | |
| 2003/0232210 A1* | 12/2003 | Haas | B29C 44/22 428/500 |
| 2006/0246242 A1* | 11/2006 | Siegel | A23B 4/10 428/34.1 |
| 2006/0257594 A1* | 11/2006 | Haas | B32B 5/18 428/32.34 |
| 2015/0348819 A1* | 12/2015 | Taya | H01L 21/683 428/343 |

FOREIGN PATENT DOCUMENTS

| | | |
|---|---|---|
| WO | 2009/142825 | 11/2009 |
| WO | 2014/103467 | 7/2014 |

OTHER PUBLICATIONS

International Search Report and Written Opinion dated Mar. 17, 2016 issued in corresponding International Application No. PCTUS2015/065939 filed Dec. 16, 2015.
International Preliminary Report on Patentability dated Jul. 11, 2017 issued in corresponding International Application No. PCTUS2015/065939 filed Dec. 16, 2015.

* cited by examiner

*Primary Examiner* — Christopher Polley
(74) *Attorney, Agent, or Firm* — Avery Dennison Corporation

(57) ABSTRACT

An inherently printable polymeric material is provided. The polymeric material includes a homogenous mixture of a thermoplastic polymer with a Tg of about 30-80° C., a cyclic olefin copolymer, an ionomer of ethylene and methacrylic acid, and a thermoplastic rubber. The polymeric material can be printed without requiring printing receptive layers or treatments. The polymeric material can be thermoformed, yet retains its printability even after thermoforming.

73 Claims, No Drawings

INHERENTLY PRINTABLE POLYMERIC MATERIAL AND RELATED METHODS

CROSS-REFERENCE TO RELATED APPLICATION

The present application claims the benefit of U.S. Provisional Application No. 62/099,744 filed Jan. 5, 2015, which is incorporated herein by reference in its entirety.

FIELD

The present subject matter relates to a composite polymeric material that can accept and retain printed indicia without requiring printing receptive layers or treatments. The printability of the polymeric material is maintained even after being subject to thermoforming.

BACKGROUND

There are several factors to consider in order for an ink to adhere to a substrate. It is generally accepted that the substrate should have a relatively high surface energy compared to the ink. This allows for the rapid laminar flow of the ink over the substrate. An increased surface area (best measured as roughness) is also considered important for the anchorage of the ink to the substrate. And finally, the porous nature of the substrate can aid the absorption of ink for a more intimate bond. Conventional polymeric films usually have an inherent low surface energy (dyne level), tend to have chemically inert, smooth, non-porous surfaces, and thus are non-receptive to bonding with substrates, printing inks, coatings, and adhesives. These conventional polymeric films thus require a print-receptive layer or treatment in order to increase their surface energy to properly retain ink.

Several processes are known for increasing the surface energy of conventional polymeric films, including corona, flame, and plasma surface treatment. Films subjected to such treatment exhibit a higher surface energy and a higher roughness, which improves various characteristics, including print quality on the film. Typically, such treatments are applied to the films at the time of production, just subsequent to extrusion and in-line prior to converting, and again at a later time just prior to printing. In contrast, conventional film that is not treated at the time of production will typically not satisfactorily accept printing, coating or lamination, even when a later surface treatment is applied.

The effects of the initial surface treatment can diminish over time, e.g. when the films are subject to various environmental conditions, such as high-moisture conditions or after thermoforming. The films can lose sufficient surface energy and become unprintable and uncoatable, and therefore such treatments are often applied again at a later time, e.g. just prior to printing, coating or laminating.

Although the effects of the initial surface treatment diminishes over time or when the film is subject to thermoforming, it is nevertheless necessary for printability of the films. This is because many films, e.g. polyolefin films, are almost untreatable when they set after production, and subsequent surface treatments just prior to printing may not produce satisfactory print adhesion. Therefore, many films require two treatments—one just subsequent to production, and one just prior to printing or other conversion process. Furthermore, these surface treatments often require specialized equipment, which increases the cost of printing on these films.

Accordingly, there exists a need for an improved polymeric material that can be thermoformed, and does not require printing receptive layers or treatments in order to satisfactorily accept and retain printed indicia.

SUMMARY

The difficulties and drawbacks associated with previously known polymer films and film printing strategies are addressed in the present inherently printable polymer composite material and related methods.

The present subject matter relates to a polymeric composite material that does not require a separate printing receptive layer or treatment in order to adequately accept and retain printing inks. In several embodiments, the polymeric composite is free of printing receptive layers or treatments. The polymeric composite can be subject to moisture or thermoforming, yet still retain its printability over time.

In one aspect, the present subject matter provides a polymeric composite comprising a melted and cooled homogeneous mixture. The mixture includes about 15-30 weight percent (wt %) of a thermoplastic polymer with a glass transition temperature (Tg) of about 30-80° C.; about 20-65 wt % of a cyclic olefin copolymer; about 10-25 wt % of an ionomer of ethylene and methacrylic acid; and about 10-25 wt % a thermoplastic rubber.

In another aspect, the present subject matter provides a substrate having a surface, wherein at least a portion of the surface is covered by a polymeric material. The polymeric material comprises a melted and cooled homogeneous mixture including about 15-30 wt % of a thermoplastic polymer with a Tg of about 30-80° C.; about 20-65 wt % of a cyclic olefin copolymer; about 10-25 wt % of an ionomer of ethylene and methacrylic acid; and about 10-25 wt % a thermoplastic rubber.

In still another aspect, the present subject matter provides a method of forming a polymeric material. The method includes preparing a mixture comprising about 15-30 wt % of a thermoplastic polymer with a Tg of about 30-80° C., about 20-65 wt % of a cyclic olefin copolymer, about 10-25 wt % of an ionomer of ethylene and methacrylic acid, and about 10-25 wt % a styrenic block copolymer. The mixture is melted and cooled to thereby form the polymeric material.

In another aspect, the present subject matter provides a method of forming a polymeric material having printed indicia on a surface thereof. The method includes preparing a mixture comprising about 15-30 wt % of a thermoplastic polymer with a Tg of about 30-80° C., about 20-65 wt % of a cyclic olefin copolymer, about 10-25 wt % of an ionomer of ethylene and methacrylic acid, and about 10-25 wt % a styrenic block copolymer. The mixture is melted and cooled to thereby form a printable polymeric material. The method includes printing indicia on a surface of the polymeric material.

The present subject matter provides an inherently printable polymeric material that retains its printability even after being subject to thermoforming, moist environments, or other influences that ordinarily decrease the effect of traditional printing receptive treatments.

As will be realized, the subject matter described herein is capable of other and different embodiments and its several details are capable of modifications in various respects, all without departing from the claimed subject matter. Accordingly, the description is to be regarded as illustrative and not restrictive.

DETAILED DESCRIPTION OF THE EMBODIMENTS

The subject matter described herein provides a specific blend of four polymers used in concert to create an inherently printable polymeric composite material that does not require surface treatment or a special coating in order to properly accept and retain printed ink. In several embodiments, the polymeric composite is free of printing receptive layers or treatments.

The polymeric composite comprises a blend of four dissimilar polymers, and requires no surface treatment in order to satisfactorily retain printed indicia. The blend comprises a homogenous mixture of a thermoplastic polymer with a Tg of about 30-80° C., a cyclic olefin copolymer (COC), an ionomer of ethylene and methacrylic acid, and a thermoplastic rubber.

The mixture ratios of the four specific polymers are limited, as too much or too little of any given component compromises the printability of the resulting polymeric material. The four polymers can be physically combined by combining and melting the polymers together to form a homogenous mixture, which can then be cooled or allowed to cool to form the polymeric composite. This blend creates a material that has enough polarity to attach to ink components. The immiscibility of some components creates a natural texture that increases surface roughness. The resulting polymeric composite is inherently printable, which means, even after thermoforming, the polymeric material does not require printing receptive layers or treatments in order to satisfactorily accept and retain printed indicia. Additionally, the resulting polymeric composite may be characterized by a loss of about 85% of its storage modulus (E') at 80° C. (relative to 23° C. ambient temperature). Alternatively, at 80° C. the storage modulus of the resulting polymeric composite may be under 30 kpsi. The polymeric composite can be printed for example, using flexographic printing techniques and ultraviolet flexographic inks.

The resultant polymeric composite has a low surface energy, which is contrary to the common perception that only a high surface energy substrate can be printed. However, printability of a film is a function of several factors, wherein the net goal is to gain adhesion to the film. Surface energy only reflects the ability of the ink to spread out rapidly over the surface of the film. In this regard, it is desired to have the surface energy of the ink less than the surface energy of the film. However, this does not guarantee adhesion. For example, a hard, non-porous material (such as biaxially-oriented polypropylene) can have a very high surface energy, but the ink adhesion may still be very poor because the surface is non-porous.

While not to be bound to any particular theory, it is believed that the all of the materials are amorphous (only the EVOH has significant crystallinity). This suggests that there is enough free volume in the mixture that could be conducive to ink absorption. Further, these resins are not fully compatible with each other, so there are likely discontinuous phase domains within the mixture which makes the composite material rough and porous to the inks. Such porosity can create space for ink chemistries to penetrate and develop adhesion with the polymeric composite material.

The polymeric material can be formed into a stand-alone film for use in various applications, or can be used in combination with a substrate as a printable layer on the substrate. The polymeric material can optionally be formed into a contoured article or a printable layer on a contoured article, such as a bottle or other container. Further, the polymeric composite can be used as an antiblocking film for various substrates, such as polymeric films that normally require PET liners, for example.

The polymeric composite satisfactorily accepts and retains printed indicia without requiring printing receptive layers or treatments (e.g. corona treatment). Utilizing the polymeric composite of the present subject matter thus results in reduced cost, time, and labor in preparing a printable polymeric surface, such as a polymer film. Furthermore, specialized equipment is not necessary for treating the polymeric composite material in order to render it printable. The polymeric composite retains its printability over time despite being subject to various processes (e.g. thermoforming) and environments (e.g. high humidity), which ordinarily reduce the effect of conventional printing receptive treatments or layers.

The various components of the inherently printable polymeric composite will now be described in more detail.

Thermoplastic Polymer

In accordance with the present subject matter, the polymer composite includes a thermoplastic polymer. The thermoplastic polymer is included to allow for thermoforming of the polymer composite. In one embodiment, the thermoplastic polymer has a glass transition temperature (Tg) of about 30-80° C. The thermoplastic polymer can be included from about 15-30 weight percent (wt %) of the polymer composite. In one embodiment, the thermoplastic polymer is included at about 28 wt %.

In one embodiment, the thermoplastic polymer is hydrophilic, i.e. having water contact angles being below about 90°. In another embodiment, the thermoplastic polymer is semi-amorphous or semi-crystalline. In another embodiment the thermoplastic polymer is polar.

The thermoplastic polymer is not particularly limited by the present subject matter, and can include for example, ethylene vinyl alcohol (EVOH), Nylon 6, Nylon 6/6,6, Nylon 10, polyethylene terephthalate (PET), or combinations thereof.

In one aspect, the thermoplastic polymer comprises EVOH. Ethylene vinyl alcohol, which is a semi-crystalline thermoplastic copolymer of ethylene and vinyl alcohol. EVOH copolymer is defined by the mole % ethylene content. That is, lower ethylene content grades have higher barrier properties and higher ethylene content grades have lower temperatures for extrusion.

The Tg values of EVOH copolymers vary depending on the copolymer composition, decreasing as ethylene content increases. Glass transition temperatures of various EVOH copolymers with 27, 32, and 48 mol % ethylene are about 60° C., 57° C., and 49° C., respectively. In one embodiment, the EVOH has an ethylene content of about 30-50 mol %, or about 48 mol %.

The copolymer composition (i.e., relative amounts of ethylene and vinyl alcohol) affects properties of EVOH, such as gas barrier, mechanical properties, water vapor transmission, etc. EVOH resins are commercially available in a range of compositions, e.g. vinyl alcohol contents of about 52-76 mol %.

Suitable EVOH resins can include those from Kuraray Co. Ltd., which produces EVOH resin under the name "EVAL," with grades having varying ethylene content, such as C type (35 mol % ethylene), E type (44 mol % ethylene), F type (32 mol % ethylene), G type (48 mol % ethylene), H type (38 mol % ethylene), J type (32 mol % ethylene), L type (27 mol % ethylene), M type (24 mol % ethylene), and T type (32 mol % ethylene). Nippon Gohsei produces suitable EVOH resins under the trade name "Soarnol", and has production sites in Misushima, Japan; La Porte, Tex. in the USA; and Hull, England. Chang Chun Petrochemical produces suitable EVOH resins under the trade name "EVASIN" and has a production site in Taipei, Taiwan.

Cyclic Olefin Copolymer

In accordance with the present subject matter, the polymer composite material comprises a Cyclic Olefin Copolymer (COC), which comprises an amorphous thermoplastic polymer that can be made from different types of cyclic monomers and polymerization methods. COCs offer high transparency, outstanding moisture barrier, high stiffness and strength. In one embodiment, the COC is included from about 20-65 wt %, or about 28 wt %.

In blends, COCs provide higher modulus, greater heat resistance, and increased barrier for various articles. These blends are easily processed on conventional cast and blown film lines within standard polyolefin operating parameters. However, COCs are nonpolar materials, so relatively few materials stick to them. Before a COC material can be printed or coated, it typically needs corona or plasma pretreatment to functionalize its surface and allow bonds to form with the printed ink.

COCs are produced by one of two methods. The first is by chain copolymerization of cyclic monomers such as 8,9,10-trinorborn-2-ene (norbornene) or 1,2,3,4,4a,5,8,8a-octahydro-1,4:5,8-dimethanonaphthalene (tetracyclododecene) with ethene, (e.g., TOPAS Advanced Polymer's TOPAS uses ethylene and cyclopentadiene to form norbornene, then added to ethylene again to form COC, or Mitsui Chemical's APEL).

The second method utilizes ring-opening metathesis polymerization of various cyclic monomers followed by hydrogenation (Japan Synthetic Rubber's ARTON, Zeon Chemical's Zeonex and Zeonor). These later materials using a single type of monomer are identified as cyclic olefin polymers (COPs).

Increased norbornene content (i.e. cyclic olefin content) in COCs increases the glass transition temp of the COC. COCs are known to be a high moisture barrier and have a low absorption rate.

TOPAS is the trade name of one type of COC manufactured by Topas Advanced Polymers GmbH. TOPAS is a COC copolymerized from norbornene and ethylene using a metallocene catalyst. TOPAS is currently offered as basic grades, such as 9506, 8007, 6013, 6015, 5013, and 6017. Co-monomer content determines the heat deflection temperature and TOPAS grades with high cyclic olefin content have higher heat resistances. Among these, TOPAS grade 5013 has the highest flowability and TOPAS grade 6017 the highest heat resistance. TOPAS possesses optical properties comparable with polymethylmethacryalte (PMMA) and superior heat resistance to polycarbonate (PC). Moreover, it possesses excellent dimensional stability due to the fact that it absorbs almost no moisture, and acts as a good water vapor barrier.

Apel from Mitsui Chemicals America, Inc. including APL8008T, APL6509T, APL6011T, APL6013T, APL5014DP, APL5514ML, and APL6015T are also suitable for use as the COC.

COCs typically have a Tg ~50-200° C., Norbornene content ~25-70 mol % or 50-90 wt %. In one embodiment, the Tg of the COC included in the polymer composite is from 55-80° C. In another embodiment, the norbornene content of the COC is about 55-70 wt % or 25-40 mol %. In another embodiment, the COC has a norbornene content of about 60 wt %, a Tg of about 60° C. A suitable COC is Topas 9506.

In one embodiment, COP is used instead of, or in addition to a COC. COPs differ from COCs in that COPs use a single type of monomer during formulation. Zeonex/Zeonor COP from Zeon Chemicals L.P., 4111 Bells Lane, Louisville, Ky. are suitable for including in the polymer composite.

Like many other thermoplastics, COCs and COPs can be extruded, injection molded and machined. Both of these materials come in formulations whose glass transition temperatures can range from ~30° C. to ~180° C.

Ionomer of Ethylene and Methacrylic Acid

In accordance with the present subject matter, an ionomer is included in the polymer composite material at about 10-25 wt %, or about 22 wt %. An ionomer is a polymer that comprises repeat units of both electrically neutral repeating units and a fraction of ionized units (usually no more than 15 mole percent) covalently bonded to the polymer backbone as pendant moieties. This means that most ionomers are copolymers of the neutral segments and the ionized units, which usually consist of carboxylic acid groups. The ionomer classification depends on the level of substitution of ionic groups as well as how the ionic groups are incorporated into the polymer structure.

Suitable ionomers include, for example acid-containing ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate.

In one embodiment, an ionomer of ethylene-acid copolymer wherein the acid is methacrylic acid or acrylic acid, or an ethylene acid acrylate terpolymer is used. The ionomer can be partially neutralized with metal salts of zinc, sodium, lithium, or other neutralizing agent. In one aspect, an ionomer of ethylene and methacrylic acid is used, such as ethylene poly(ethylene-co-methacrylic acid) ionomer which has been partially reacted with metallic salts to form ionic crosslinks between the acid groups within a chain, or between neighboring chains.

Ionomers of ethylene and methacrylic acid vary by differing acid levels and melt indexes. A suitable ionomer includes products with the trade name Surlyn®, for example grades 1705-1, 8920, 8940, 7940, 8150, 8320, 8528, 9120, 9150, 9320, 9520, 9650 sold by E.I. duPont de Nemours & Co. of Wilmington, Del., see U.S. Pat. Nos. 3,264,272; 3,454,280; and U.S. Pat. No. 5,298,571.

Other suitable ionomers of ethylene and methacrylic acid include Clarix®, including various grades such as 310901U-01, 311301U-01, 131E-01, 132E-01, 133E-01, 134E-01, 136E-01, 310901U-01, 111301-01, 210805U-01, 110901G30-01 by A. Schulman; or Iotek® including various grades such as 3110, 4200, 7010, 8000, 8020, 8030 from ExxonMobil.

Thermoplastic Rubber

In accordance with the present subject matter, a thermoplastic rubber is included in the polymer composite at about 10-25 wt %, or about 22 wt %. The thermoplastic rubber can comprise a styrenic block copolymer, such as a styrene elastomer including a vinyl-polyisoprene block in which the styrene content ranges from 10-30%.

In several embodiments, a hydrogenated or non-hydrogenated vinyl-bond rich styrene-isoprene-styrene (SIS) block copolymer can be used in the polymer composite. In other embodiments, a hydrogenated styrene-butadiene-styrene (SEBS) block copolymer, or a hydrogenated styrene-polybutadiene-styrene (SEPS) block copolymer can be used.

A suitable SIS block copolymer can include HYBRAR™, which is a series of high performance thermoplastic rubbers developed by Kuraray Co., Ltd. Suitable vinyl-bond rich triblock copolymers include non-hydrogenated vinyl-bond rich SIS block copolymers, such as Hybrar® 5125 and 5127, and hydrogenated vinyl-bond rich SIS block copolymers, such as Hybrar® 7125 and 7311. a vinyl-bond rich triblock copolymer, such as Hybrar®, non-hydrogenated styrene isoprene copolymer (Hybrar® 5127), hydrogenated vinyl-bond rich styrene-isoprene-styrene (SIS) block copolymer, e.g. Hybrar® 7125, Optional Layers and Treatments As previously described, the polymeric composite can be formed into a film, layer, or other desired shape that is inherently printable, even after thermoforming. The polymer composite does not require the use of corona treatment, atmospheric plasma treatment, flame plasma treatment, chemical plasma treatment, or the like, in order for ink to satisfactorily adhere to a surface of the polymeric material. When formed into a specific shape, such as a film or layer for example, the polymer composite can include other layers or treatments for specific intended uses. Although not required, the film or layer of polymeric material can include printing receptive layers or treatments on a surface thereof (e.g. corona treatment). Further, the polymer composite film can include hydrophobic or hydrophilic layers or treatments, additional film layers, or can be applied over a substrate, such as a container for example as a printing receptive layer for the container. Additionally, the polymer composite can include ink layers or other indicia, including UV curable inks, or other ink layers.

Combinations

In accordance with one embodiment of the present subject matter, the polymer composite is applied to a surface of a substrate. The polymer composite can be in the form of a film or layer on the substrate, and can be thermoformed with the substrate or separate therefrom. The polymer composite can be free of printing receptive layers or treatments because it can retain its inherent printability even after thermoforming.

The substrate may be a polymeric film, for example, and the polymer composite can be coextruded as a film and onto the polymeric film. The layered structure of the polymeric film and the polymer composite can be thermoformed into various shapes and the thermoformed object can accept and retain printed indicia on a surface of the polymer composite layer.

Alternatively, the polymer composite can itself be thermoformed onto a substrate, or separate therefrom. For example, the polymer composite can be thermoformed over a glass, metal, or other substrate by the application of heat, pressure, or other means. The polymer composite can accept and retain ink before or after thermoforming.

The substrate is not particularly limited by the present subject matter. Various substrates are contemplated and can include any item to which the polymer composite can be applied. Non-limiting examples include one or more containers, food items, household goods, tools, instruments, furniture, consumer items, industrial items, mechanized items such as cars or boats, consumable items, lumber, construction materials, raw materials, etc.

Methods

In accordance with the present subject matter, a method of forming a printable polymeric material is provided. The method includes preparing a mixture comprising about 15-30 wt % of a thermoplastic polymer with a Tg of about 30-80° C., about 20-65 wt % of a cyclic olefin copolymer, about 10-25 wt % of an ionomer of ethylene and methacrylic acid, and about 10-25 wt % a styrenic block copolymer. The mixture can be prepared by simply physically combining the components together in dry form.

The method includes melting the mixture. Melting the mixture can include heating and agitating, stirring, or otherwise mixing the melt to prepare a homogenous blend of the components. The homogenous melt is then cooled to thereby form a printable polymeric material. Cooling can include forming the polymeric material into a specific shape, such as a film or three-dimensional object that has an inherently printable surface. Alternatively, the polymeric composite can be formed into extrudable pellets for later forming into a printable film or other object.

A film of the polymeric material can be formed by melt extrusion or other film forming processes. The film of the polymeric material can be co-extruded onto a polymer substrate, such as being coextruded with other polymer films. Applying the present film of the polymeric material to a polymer substrate thereby avoids having to apply additional print receptive coatings on the polymer substrate. The method can include thermoforming the polymeric material, which may or may not also include thermoforming the underlying polymer substrate.

Several methods also include printing indicia on a surface of the polymeric material. The indicia can comprise ink, such as UV curable ink applied by flexographic printing processes for example. Indicia comprising other inks and applied by other processes can be used in accordance with the present subject matter, such as rotogravure, off-set, lithography, or others.

The present subject matter also provides methods for attaching a heat formable film to a substrate. The methods do not utilize solvent seams and can be incorporated with low density polymeric films. The methods allow for further handling or processing of the heat formable films subsequent to adhesive application. One preferred method provides a release liner for the heat formable film that is recyclable because no silicon-containing or fluorine-containing materials are used as release agents.

The methods provide inherently printable polymeric composite material that does not require printing receptive layers or treatments.

Examples

As shown in Tables 1-2, examples of polymeric composites were prepared and formed into films. Examples 1 and 7-13 include varying amounts of EVOH, COC, Ionomer, and thermoplastic rubber. Examples 2-6 are included as comparative examples and include other polymers as indicated. All percentages are by weight. The polymeric composites of Examples 2-6 were all formed, printed, and tested for ink anchorage. Only Example 1 showed unexpected ink anchorage success. The compositions of the subsequent polymeric composites were focused on variations around Example 1, the known unexpected success. For example, Example 7 is a chemical replica of Example 1 except that it is formed using different grades of the primary components.

In Examples 1-6, the EVOH has a 44-mol % ethylene content, the COC is Topas 8007, the ionomer is Surlyn 9120, and the thermoplastic rubber is Hybrar 7125. In Examples 7-13, the EVOH has a 48-mol % ethylene content, the COC is Topas 9506, the ionomer is Surlyn 1705-1, which is a Zn-neutralized ionomer of ethylene, and the thermoplastic rubber is Hybrar 7311, which is a hydrogenated thermoplastic rubber. In Tables 1-2, PETG refers to Polyethylene terephthalate glycol-modified; RCP refers to random copolymer, which is a single-phase system made by polymerizing low levels of ethylene with propylene, where the ethylene monomer is incorporated randomly along the polymer chain; GPPS refers to general purpose polystyrene polymer, which is an aromatic polymer made from the monomer styrene; K-Resin refers to styrene-butadiene copolymers (SBC), which are a family of clear resins produced by Chevron Phillips Chemical Company LP; EVA (18) refers to an ethylene vinyl acetate resin with 18% vinyl acetate; and Slip/AB refers to an inorganic additive in a polyethylene carrier resin, included as an antiblocking agent.

Example 7 was prepared as a control. Example 8 had 20% more EVOH and COC than Example 7. Example 9 has 20% less EVOH and COC than Example 7. Example 10 has no COC. Example 11 has no ionomer. Example 12 has no thermoplastic rubber. Example 13 has no EVOH.

TABLE 1

Composition of Polymer Composite Films for Examples 1-6

| No. | PETG | EVOH 44 mol % | Topas 8007 | RCP | Surlyn 9120 | Hybrar 7125 | GPPS | K-Resin | EVA(18) | Slip/AB |
|---|---|---|---|---|---|---|---|---|---|---|
| Example 1 | | 35% | 35% | | 15% | 15% | | | | |
| Example 2 | | 35% | | 35% | 15% | 15% | | | | |
| Example 3 | | | | | | | 50% | 50% | | |
| Example 4 | 100% | | | | | | | | | |
| Example 5 | | 90% | | | | | | | 10% | |
| Example 6 | | 72% | | | 18% | | | | | 10% |

TABLE 2

Composition of Polymer Composite Films for Examples 7-13

| No. | PETG | EVOH 48 mol % | Topas 9506 | RCP | Surlyn 1705-1 | Hybrar 7311 | GPPS | K-Resin | EVA(18) | Slip/AB |
|---|---|---|---|---|---|---|---|---|---|---|
| Example 7 | | 35% | 35% | | 15% | 15% | | | | |
| Example 8 | | 42% | 42% | | 8% | 8% | | | | |
| Example 9 | | 28% | 28% | | 22% | 22% | | | | |
| Example 10 | | 54% | | | 23% | 23% | | | | |
| Example 11 | | 41% | 41% | | | 18% | | | | |
| Example 12 | | 41% | 41% | | 18% | | | | | |
| Example 13 | | | 54% | | 23% | 23% | | | | |

In the following Table 3, films of Examples 7-13 were printed with a UV curable ink. For each example, the surface energy of the films, advancing contact angle of the printing ink, receding contact angle of the printing ink, and the ratio of the receding contact angle to the advancing contact angles (R/A) were evaluated.

TABLE 3

Printing Evaluation of Examples 7-13

| | Surface Energy | Contact Angle | | |
|---|---|---|---|---|
| No. | (Dynes) | Advancing | Receding | Ratio of R/A |
| Example 7 | 32 | 117 | 42 | 0.36 |
| Example 8 | 32 | 113 | 34 | 0.30 |
| Example 9 | 32 | 122 | 30 | 0.25 |
| Example 10 | 32 | 114 | 20 | 0.18 |
| Example 11 | 32 | 115 | 34 | 0.21 |

TABLE 3-continued

Printing Evaluation of Examples 7-13

| | Surface Energy | Contact Angle | | |
|---|---|---|---|---|
| No. | (Dynes) | Advancing | Receding | Ratio of R/A |
| Example 12 | 30 | 97 | 0 | 0.00 |
| Example 13 | 30 | 118 | 69 | 0.58 |

A lower value of the advancing contact angle of a film is preferred, and such lower values indicate the resistance of the liquid ink from spreading on the film after it is applied. A higher valued of the receding contact angle of a film is preferred, and such higher values indicate the retention of the liquid ink on the film. A higher ratio of R/A is preferred, and such higher values indicate the overall printability of the film.

In the following Table 4, Examples 1 and 7-13 were evaluated by printing the films with a UV curable ink. The printed films were evaluated visually for print uniformity (i.e. no ink spots, or discontinuities or breaks in the ink lines). The printed films were tape tested for adhesion using 3M 810 tape on oriented and upstretched films. A ranking of 1 means the film performed best of all the film and a ranking of 8 means the film performed the worst of all the films.

TABLE 4

Evaluation of Film Examples 1 and 7-13

| | | Tape Test | | Draw | Weighted |
|---|---|---|---|---|---|
| No. | Visual 45% | Oriented 25% | Unstretched 10% | Shape 20% | Ranking 100% |
| Example 1 | 7 | 3 | 2 | 2 | 4.50 |
| Example 7 | 6 | 4 | 4 | 6 | 5.30 |
| Example 8 | 1 | 8 | 7 | 8 | 4.75 |
| Example 9 | 5 | 1 | 1 | 3 | 3.20 |
| Example 10 | 2 | 6 | 6 | 7 | 4.40 |
| Example 11 | 4 | 7 | 8 | 5 | 5.35 |

TABLE 4-continued

Evaluation of Film Examples 1 and 7-13

| No. | Visual 45% | Tape Test Oriented 25% | Tape Test Unstretched 10% | Draw Shape 20% | Weighted Ranking 100% |
|---|---|---|---|---|---|
| Example 12 | 3 | 5 | 5 | 4 | 3.90 |
| Example 13 | 8 | 2 | 3 | 1 | 4.60 |

As can be seen, Example 9 had the best (i.e. lowest) overall weighted score and performed the best for retaining the printed ink, thus indicating that the formulation window is very tight. Examples 10-13, each excluding one of the four components of the polymer composite, produce less favorable results. Example 13 demonstrates good ink anchorage and forming, but the visual appearance is poor. This suggests that the EVOH is not critical for ink anchorage, but primarily contributes to maintaining the surface uniformity upon extension in the thermoforming process. The other three components are integrally connected to provide the required ink anchorage. Furthermore, a mono-layered film of each component did not perform well.

Many other benefits will no doubt become apparent from future application and development of this technology. All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter addresses many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scopes of the claimed subject matter, as expressed in the appended claims.

What is claimed is:

1. A polymeric composite comprising:
    about 15-30 wt % of a thermoplastic polymer with a Tg of about 30-80° C.;
    about 20-65 wt % of a cyclic olefin copolymer;
    about 10-25 wt % of an ionomer of ethylene and methacrylic acid; and
    about 10-25 wt % a thermoplastic rubber.

2. The polymeric composite of claim 1, wherein the thermoplastic polymer comprises ethylene vinyl alcohol.

3. The polymeric composite of claim 2, wherein the ethylene vinyl alcohol has an ethylene content of about 30-50 mol %.

4. The polymeric composite of claim 2, wherein the ethylene vinyl alcohol has an ethylene content of about 48 mol % and is included at about 28 wt %.

5. The polymeric composite of claim 1, wherein the cyclic olefin copolymer has a norbornene content of about 55-70 wt % and a Tg of about 55-80° C.

6. The polymeric composite of claim 1, wherein the cyclic olefin copolymer has a norbornene content of about 60 wt %, a Tg of about 60° C., and is included at about 28 wt %.

7. The polymeric composite of claim 1, wherein the ionomer of ethylene and methacrylic acid is partially neutralized with zinc salt.

8. The polymeric composite of claim 1, wherein the ionomer is included at about 22 wt %.

9. The polymeric composite of claim 1, wherein the thermoplastic rubber comprises a styrenic block copolymer.

10. The polymeric composite of claim 9, wherein the styrenic block copolymer comprises styrene isoprene copolymer.

11. The polymeric composite of claim 9, wherein the styrenic block copolymer is hydrogenated.

12. The polymeric composite of claim 1, wherein the thermoplastic rubber is included at about 22 wt %.

13. The polymeric composite of claim 1, wherein the polymeric composite is in the form of a film.

14. The polymeric composite of claim 1, further including printed indicia on a surface of the polymeric composite.

15. The polymeric composite of claim 14, wherein the printed indicia comprises UV cured ink.

16. The polymeric composite of claim 1, wherein the polymeric composite has a surface energy of about 30-32 dynes.

17. The polymeric composite of claim 1, wherein surfaces of the polymeric composite are free of printing receptive layers or treatments.

18. The polymeric composite of claim 1, wherein the polymeric composite is in the form of a thermoformed object.

19. A substrate having a surface, the substrate comprising:
    a polymeric material including;
    about 15-30 wt % of a thermoplastic polymer with a Tg of about 30-80° C.;
    about 20-65 wt % of a cyclic olefin copolymer;
    about 10-25 wt % of an ionomer of ethylene and methacrylic acid; and
    about 10-25 wt % a thermoplastic rubber,
    wherein at least a portion of the surface is covered by the polymeric material.

20. The substrate of claim 19, wherein the polymeric material is in the form of a film.

21. The substrate of claim 19, wherein the substrate and the polymeric material are in the form of coextruded films.

22. The substrate of claim 19, wherein the polymeric material is in the form of a thermoformed object.

23. The substrate of claim 19, wherein the thermoplastic polymer comprises ethylene vinyl alcohol.

24. The substrate of claim 23, wherein the ethylene vinyl alcohol has an ethylene content of about 30-50 mol %.

25. The substrate of claim 23, wherein the ethylene vinyl alcohol has an ethylene content of about 48 mol % and is included at about 28 wt %.

26. The substrate of claim 19, wherein the cyclic olefin copolymer has a norbornene content of about 55-70 wt % and a Tg of about 55-80° C.

27. The substrate of claim 19, wherein the cyclic olefin copolymer has a norbornene content of about 60 wt %, a Tg of about 60° C., and is included at about 28 wt %.

28. The substrate of claim 19, wherein the ionomer of ethylene and methacrylic acid is partially neutralized with zinc salt.

29. The substrate of claim 19, wherein the ionomer is included at about 22 wt %.

30. The substrate of claim 19, wherein the thermoplastic rubber comprises a styrenic block copolymer.

31. The substrate of claim 30, wherein the styrenic block copolymer comprises styrene isoprene copolymer.

32. The substrate of claim 30, wherein the styrenic block copolymer is hydrogenated.

33. The substrate of claim 19, wherein the thermoplastic rubber is included at about 22 wt %.

34. The substrate of claim 19, wherein surfaces of the polymeric material are free of printing receptive layers or treatments.

35. A method of forming a polymeric material comprising:
preparing a mixture comprising about 15-30 wt % of a thermoplastic polymer with a Tg of about 30-80° C., about 20-65 wt % of a cyclic olefin copolymer, about 10-25 wt % of an ionomer of ethylene and methacrylic acid, and about 10-25 wt % a styrenic block copolymer, melting the mixture; and
cooling the mixture to thereby form the polymeric material.

36. The method of claim 35, further including forming the mixture into a film.

37. The method of claim 36, wherein the film is formed by extrusion.

38. The method of claim 35, further including coextruding the mixture onto a polymer substrate.

39. The method of claim 35, further including thermoforming the polymeric material.

40. The method of claim 35, wherein surfaces of the polymeric material are free of printing receptive layers or treatments.

41. The method of claim 35, wherein the thermoplastic polymer comprises ethylene vinyl alcohol.

42. The method of claim 41, wherein the ethylene vinyl alcohol has an ethylene content of about 30-50 mol %.

43. The method of claim 41, wherein the ethylene vinyl alcohol has an ethylene content of about 48 mol % and is included at about 28 wt %.

44. The method of claim 35, wherein the cyclic olefin copolymer has a norbornene content of about 55-70 wt % and a Tg of about 55-80° C.

45. The method of claim 35, wherein the cyclic olefin copolymer has a norbornene content of about 60 wt %, a Tg of about 60° C., and is included at about 28 wt %.

46. The method of claim 35, wherein the ionomer of ethylene and methacrylic acid is partially neutralized with zinc salt.

47. The method of claim 35, wherein the ionomer is included at about 22 wt %.

48. The method of claim 35, wherein the thermoplastic rubber comprises a styrenic block copolymer.

49. The method of claim 48, wherein the styrenic block copolymer comprises styrene isoprene copolymer.

50. The method of claim 48, wherein the styrenic block copolymer is hydrogenated.

51. The method of claim 35, wherein the thermoplastic rubber is included at about 22 wt %.

52. The method of claim 35, wherein the polymeric material is in the form of a film.

53. The method of claim 35, further including printing indicia on a surface of the polymeric material.

54. The method of claim 53 wherein the indicia are formed with UV curable inks.

55. The method of claim 35, wherein the polymeric material has a surface energy of about 30-32 dynes.

56. A method of forming a polymeric material having printed indicia on a surface thereof, the method comprising:
preparing a mixture comprising about 15-30 wt % of a thermoplastic polymer with a Tg of about 30-80° C., about 20-65 wt % of a cyclic olefin copolymer, about 10-25 wt % of an ionomer of ethylene and methacrylic acid, and about 10-25 wt % a styrenic block copolymer, melting the mixture;
cooling the mixture to thereby form a printable polymeric material, and
printing indicia on a surface of the polymeric material.

57. The method of claim 56, wherein surfaces of the polymeric material are free of printing receptive layers or treatments.

58. The method of claim 56, further including forming the mixture into a film by extrusion.

59. The method of claim 56, further including thermoforming the polymeric material.

60. The method of claim 56, wherein the thermoplastic polymer comprises ethylene vinyl alcohol.

61. The method of claim 60, wherein the ethylene vinyl alcohol has an ethylene content of about 30-50 mol %.

62. The method of claim 60, wherein the ethylene vinyl alcohol has an ethylene content of about 48 mol % and is included at about 28 wt %.

63. The method of claim 56, wherein the cyclic olefin copolymer has a norbornene content of about 55-70 wt % and a Tg of about 55-80° C.

64. The method of claim 56, wherein the cyclic olefin copolymer has a norbornene content of about 60 wt %, a Tg of about 60° C., and is included at about 28 wt %.

65. The method of claim 56, wherein the ionomer of ethylene and methacrylic acid is partially neutralized with zinc salt.

66. The method of claim 56, wherein the ionomer is included at about 22 wt %.

67. The method of claim 56, wherein the thermoplastic rubber comprises a styrenic block copolymer.

68. The method of claim 67, wherein the styrenic block copolymer comprises styrene isoprene copolymer.

69. The method of claim 67, wherein the styrenic block copolymer is hydrogenated.

70. The method of claim 56, wherein the thermoplastic rubber is included at about 22 wt %.

71. The method of claim 56, wherein the polymeric material is formed into a film.

72. The method of claim 56, wherein the indicia are formed with UV curable inks.

73. The method of claim 56, wherein the polymeric material has a surface energy of about 30-32 dynes.

* * * * *